United States Patent
Wu

(10) Patent No.: US 8,190,166 B2
(45) Date of Patent: May 29, 2012

(54) METHOD FOR DETERMINING PAGING TIME SLOT DURING BASE STATION EXECUTING NON-TRUNKING SERVICE IN CDMA TRUNKING SYSTEM

(75) Inventor: Chuanxi Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 168 days.

(21) Appl. No.: 12/747,859

(22) PCT Filed: Dec. 12, 2008

(86) PCT No.: PCT/CN2008/073497
§ 371 (c)(1),
(2), (4) Date: Jun. 11, 2010

(87) PCT Pub. No.: WO2009/082915
PCT Pub. Date: Jul. 9, 2009

(65) Prior Publication Data
US 2010/0267393 A1    Oct. 21, 2010

(30) Foreign Application Priority Data
Dec. 21, 2007    (CN) .......................... 2007 1 0302078

(51) Int. Cl.
*H04W 72/00* (2009.01)
(52) U.S. Cl. ................ 455/450; 455/458; 455/518
(58) Field of Classification Search .............. 455/450, 455/458, 518
See application file for complete search history.

(56) References Cited

U.S. PATENT DOCUMENTS

2004/0160942 A1* 8/2004 Kelley et al. .............. 370/350
2006/0056339 A1    3/2006 Kim et al.
(Continued)

FOREIGN PATENT DOCUMENTS

CN           101010895 A        8/2007
(Continued)

OTHER PUBLICATIONS

International Search Report in international application No. PCT/CN2008/073497, mailed Mar. 26, 2009.

(Continued)

*Primary Examiner* — Barry Taylor
(74) *Attorney, Agent, or Firm* — Oppedahl Patent Law Firm LLC

(57) ABSTRACT

A method for determining a paging time slot during a base station executing non-trunking service in a CDMA trunking system is provided. The method comprises: when a base station can determine that a mobile station operates in a slotted mode and can determine a preferred slot cycle index of the mobile station, the smaller value of the preferred slot cycle index and a max slot cycle index is selected as a first slot cycle index and the base station pages the mobile station with a slot cycle determined by the first slot cycle index; and when the base station can not determine whether the mobile station operates in the slotted mode or not, or can not determine the slot cycle index of the mobile station, the smaller value of the preferred slot cycle index of the mobile station and 1 is selected as a second slot cycle index, and the base station pages the mobile station with the slot cycle determined by the second slot cycle index. The technical scheme provided in the present invention can improve the access speed of the mobile station after power-on.

13 Claims, 3 Drawing Sheets

U.S. PATENT DOCUMENTS

2007/0021132 A1* 1/2007 Jin et al. .................... 455/518
2007/0060164 A1 3/2007 Kwon Hwan-Jonn

FOREIGN PATENT DOCUMENTS

EP 1916852 A1 4/2008
WO 2007019731 A1 2/2007

OTHER PUBLICATIONS

English translation of the written opinion of the international search authority in international application No. PCT/CN2008/073497, mailed on Mar. 26, 2009.

* cited by examiner

METHOD FOR DETERMINING PAGING TIME SLOT DURING BASE STATION EXECUTING NON-TRUNKING SERVICE IN CDMA TRUNKING SYSTEM

TECHNICAL FIELD

The present invention relates to the field of communications, and particularly to a method for determining a paging time slot during a base station executing non-trunking service in a code division multiple access (shortened as CDMA) trunking system.

BACKGROUND

Two paging modes are allowed in a CDMA system: a slotted mode and a non-slotted mode. The non-slotted mode means an operate mode in which a mobile station continuously monitors a forward-paging channel (shortened as F-PCH), rather than monitoring according to designated time slots.

Since the mobile station is required to demodulate and decode the F-PCH continuously and process messages therein, batteries will be consumed very quickly; meanwhile, system parameter messages will be broadcasted cyclically over the F-PCH when there is no paging, but for those mobile stations that have already correctly acquired these parameters and have already been in an idle state, repeated reception is also a waste.

For this reason, in order to reduce unnecessary monitoring that the mobile station performs on the F-PCH and to extend the use time of the battery in the idle state, the slotted mode, which may correspond to the non-slotted mode, has also been specified in a mobile station—base station compatibility standard for dual-mode wideband spread spectrum cellular systems (IS-95). When operating in the slotted mode, the mobile station does not monitor the F-PCH continuously in the idle state, but receives the F-PCH only in the designated time at certain time intervals according to certain rules. During each time interval when it is not necessary to receive the F-PCH, the mobile station is just like in a sleep state, a baseband processor and a radio frequency circuit reduce or even stop working so as to decrease power consumption.

In the slotted mode, a basic unit for dividing time is a time slot of the F-PCH, and its duration is 80 ms, i.e. 4 paging channel frames of a length of 20 ms respectively. In the slotted mode, the mobile station in the idle state would generally monitor the F-PCH once only at certain time intervals in the idle state, and this time interval is called a slot cycle. Within one slot cycle, the monitoring is generally performed in one or two time slots; the length of the slot cycle is a multiple of 1.28 s (=16×80 ms) and must be 1, 2, 4, 8, 16, 32, 64 or 128 times of 1.28 s; if T is used to denote the length of the slot cycle, then $T=1.28\times2^i$ s, wherein i is a slot cycle index, the value of which can be an integer from 0 to 7, while the maximum value of the slot cycle may be 2048 time slots, i.e. 163.84 s. A user can adjust a desired length of the slot cycle through setting the slot cycle index of the mobile station by himself, and then reports messages such as parameter change registration, paging initiation and paging response to the system after such adjustment.

Of course, the range of the slot cycle adjusted by the user is also limited by the current network configuration conditions. There is a parameter in a system parameter message of the mobile station within the broadcast service area, i.e. a max slot cycle index, which specifies a maximum slot cycle index allowed to be used in the current system. The slot cycle index actually used by the mobile station also has to be determined according to the actual situations.

In a trunking system, in addition to the slot cycle index and other parameters of the existing system, a max push-to-talk slot cycle index (shortened as PTT Max Slot Cycle Index) is also introduced, which specifies the maximum slot cycle index and other parameters allowed to be used in the current PTT system. At the same time, in the PTT system, various reasons have resulted in problems such as slow access when the mobile station is called after power-on, so that PTT calls and other functions are restricted. However, no technical solutions that can resolve the problems have been proposed up to now.

SUMMARY

Considering the above-mentioned problems, the present invention is proposed. The main purpose of the present invention is to resolve the problem of slow access after power-on in actual network operation by introducing a negative slot and providing a solution for determining a paging time slot in non-trunking service of a CDMA mobile station.

In order to achieve the above-mentioned objective, a method for determining a paging time slot during a base station executing non-trunking service in a CDMA trunking system is provided according to one aspect of the present invention.

A method for determining a paging time slot during a base station executing non-trunking service in a CDMA trunking system according to the present invention, comprises: when a base station can determine that a mobile station operates in a slotted mode and can determine a preferred slot cycle index of the mobile station, the smaller value of the preferred slot cycle index of the mobile station and a max slot cycle index is selected as a first slot cycle index, and the base station pages the mobile station with a slot cycle based on the first slot cycle index; and when the base station can not determine whether the mobile station operates in the slotted mode or not, or can not determine the slot cycle index of the mobile station, the smaller value of the preferred slot cycle index of the mobile station and 1 is selected as a second slot cycle index, and the base station pages the mobile station with a slot cycle based on the second slot cycle index.

Wherein the preferred slot cycle index may be determined by the following method:

if the base station judges that a PTT version number of the mobile station is greater than or equal to a predefined value and the base station has acquired negative slot information of the mobile station, then the smallest value of a max PTT slot cycle index, a PTT slot cycle index, a max slot cycle index and a slot cycle index is selected as the preferred slot cycle index;

if the base station judges that the PTT version number of the mobile station is greater than or equal to the predefined value, and if the base station has not acquired the negative slot information of the mobile station, then the base station selects the smallest value of the max PTT slot cycle index, the max slot cycle index and the slot cycle index as the preferred slot cycle index;

if the base station judges that the PTT version number of the mobile station is smaller than the predefined value, then the base station selects the smaller value of the max slot cycle index and the slot cycle index as the preferred slot cycle index;

wherein when the base station can not determine whether the mobile station operates in the slotted mode or not, or can not determine the slot cycle index of the mobile station, the value of the slot cycle index is 1, and then the preferred slot cycle index is determined by the above-mentioned method.

Specifically, the above-mentioned predefined value may be any one of 1 to 9.

The PTT version number of the mobile station may correspond to the function of the mobile station. If the PTT version number of the mobile station is 1, then it may correspond to an enhanced PTT group call; if the PTT version number of the mobile station is 2, then it may correspond to the support for fast call access into the mobile station; if the PTT version number of the mobile station is 3, then it may correspond to the support for large group paging of the mobile station; if the PTT version number of the mobile station is 5, then it may correspond to the support for negative slot paging of the mobile station and the first phase of a conventional PTT group call; if the PTT version number of the mobile station is 6, then it may correspond to the support for supplementary channel transfer signaling and the second stage of the conventional PTT group call.

That the base station can determine that the mobile station operates in the slotted mode may refer to but is not limited to the following scenarios: after the mobile station has registered, the base station can know whether the mobile station is in the slotted mode or not; and that the base station can not determine whether the mobile station operates in the slotted mode or not may refer to but is not limited to the following scenarios: before the mobile station registers, the base station knows neither whether the mobile station is in the slotted mode or not nor the specific value of the slot cycle index of the mobile station.

Moreover, the mobile station may comprise a mobile terminal, a fixed station and a vehicular station and is not limited to the equipment.

According to another aspect of the present invention, a device for determining a paging time slot during a base station executing non-trunking service in a CDMA trunking system is provided.

The device for determining a paging time slot during a base station executing non-trunking service in a CDMA trunking system according to the present invention comprises: a first determining module, a second determining module and a paging module. Wherein the first determining module is used to determine an operate mode of a mobile station, wherein the operate mode comprises: a slotted mode and a non-slotted mode; the second determining module is used to determine a paging slot cycle index of the mobile station; and the paging module is used to page the mobile station with a slot cycle determined by the paging slot cycle index determined by the second determining module.

Furthermore, the second determining module may comprise: an acquiring unit and a determining unit. Wherein the acquiring unit is used to acquire a preferred slot cycle index of the mobile station; and the determining unit is used to determine the paging slot cycle index according to the value acquired by the first determining module and the value acquired by the acquiring unit.

Specifically, when the operate mode of the mobile station acquired by the first determining module is the slotted mode and the acquiring unit has acquired the preferred slot cycle index of the mobile station, the determining unit may select the smaller value of the preferred slot cycle index and the max slot cycle index as the paging slot cycle index; when the value acquired by the first determining module is an invalid value, or the acquired operate mode of the mobile station is the non-slotted mode, or the value acquired by the acquiring unit is an invalid value, the determining unit may use 1 as the preferred slot cycle index of the mobile station and select the smaller value of the preferred slot cycle index and 1 as the paging slot cycle index.

The above technical scheme of the present invention can help resolve the problem of slow access after power-on in network operation and thereby improve the access speed after power-on by determining the slot cycle of paging the mobile station on the condition that the base station can or can not determine whether the mobile station operates in the slotted mode or not, respectively.

Other characteristics and advantages of the prevent invention will be discussed in the specification below, and will become obvious partly via the specification or become understood via the embodiments of the present invention. The purpose and other advantages of the present invention can be achieved and acquired through the authored specification, claims and the structure specially illustrated in the drawings.

BRIEF DESCRIPTION OF THE DRAWINGS

The drawings are used to provide further understanding for the present invention, constitute a part of the specification, and are used to explain the present invention together with the embodiments of the present invention, rather than constitute any limitation on the present invention. In the drawings.

DETAILED DESCRIPTION

Function Overview

In embodiments of the present invention, when a base station can determine that a mobile station operates in a slotted mode and can determine a preferred slot cycle index of the mobile station, the smaller value of the preferred slot cycle index of the mobile station and a max slot cycle index is selected as a first slot cycle index, and the base station pages the mobile station with a slot cycle determined by the first slot cycle index; and when the base station can not determine whether the mobile station operates in the slotted mode or not, or can not determine the slot cycle index of the mobile station, the smaller value of the preferred slot cycle index of the mobile station and 1 is selected as a second slot cycle index, and the base station pages the mobile station with the slot cycle determined by the second slot cycle index.

The embodiments of this application and the characteristics of the embodiments can be combined with each other when there is no conflict among them.

The preferred embodiments of the present invention are described below with reference to the drawings; it should be understood that the preferred embodiments described herein are only used to describe and explain the present invention rather than limit the present invention.

Figure 1:
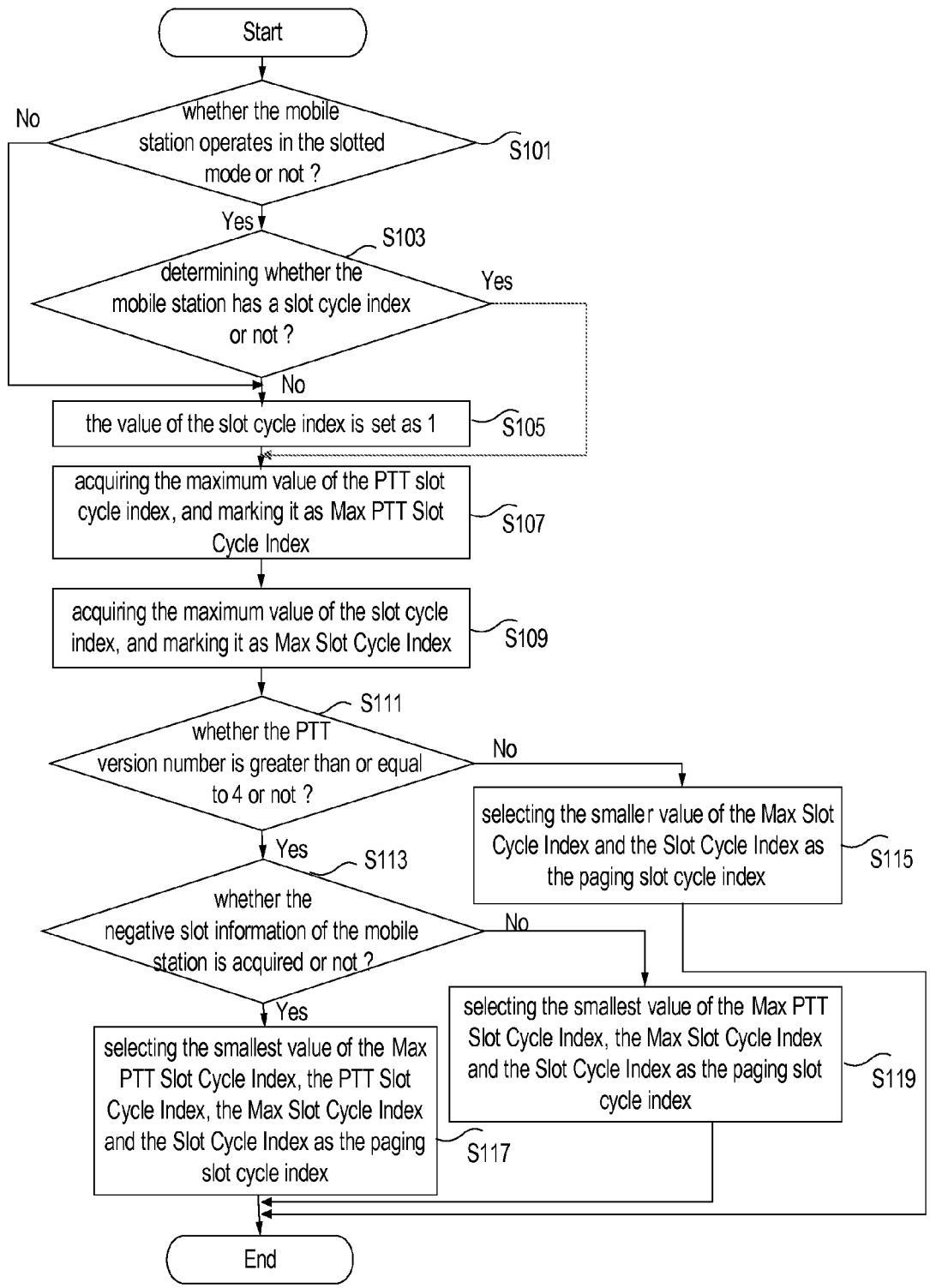
FIG. 1 is a flowchart of a method for determining a preferred slot cycle index according to embodiments of the present invention.

FIG. 1 is a flowchart of a method for determining a preferred slot cycle index according to embodiments of the present invention. As shown in FIG. 1, if the base station judges that a PTT version number of the mobile station is greater than or equal to a predefined value and has acquired negative slot information of the mobile station, then the smallest value of a max PTT slot cycle index, a PTT slot cycle index, a max slot cycle index and a slot cycle index is selected as the preferred slot cycle index; in FIG. 1, the predefined value is 4; during the specific implementation process, the predefined value may be any one of 1 to 9 according to requirements; if the PTT version number of the mobile station is greater than or equal to the predefined value, and if the base station has not acquired the negative slot information of the mobile station, then the base station selects the smallest value of the max PTT slot cycle index, the max slot cycle index and the slot cycle index as the preferred slot cycle index; and if a PTT version number of the mobile station is smaller than the predefined value, then the base station selects the smaller value of the max slot cycle index and the slot cycle index as the preferred slot cycle index. Wherein when the base station can not determine whether the mobile station operates in the slotted mode or not, or can not determine the slot cycle index of the mobile station, the value of the slot cycle index is 1, and then the preferred slot cycle index is determined according to the above-mentioned method.

Specifically as shown in FIG. 1, the method for determining the preferred slot cycle index according to the embodiments of the present invention mainly comprises the following processing (step S101-step S119):

step S101, the base station determines whether the mobile station operates in the slotted mode or not; if yes, then execute step S103; otherwise, execute step S105; during the specific implementation process, the mobile station comprises but is not limited to: a mobile terminal, a fixed station and a vehicular station, etc;

step S103, the base station determines whether the mobile station has the slot cycle index or not; if yes, then execute step S107; otherwise, execute step S105;

step S105, the value of the slot cycle index is set as 1;

step S107, the maximum value of the PTT slot cycle index is acquired and marked as Max PTT Slot Cycle Index;

step S109, the maximum value of the slot cycle index is acquired and marked as Max Slot Cycle Index;

step S111, the base station judges whether the PTT version number of a terminal is greater than or equal to 4 or not; if yes, then execute step S113; otherwise, execute step S115;

step S113, the base station judges whether it has acquired the negative slot information of the mobile station or not; if yes, then execute step S117; otherwise, execute step S119;

step S115, the smaller value of the Max Slot Cycle Index and the Slot Cycle Index is selected as the paging slot cycle index;

step S117, the smallest value of the Max PTT Slot Cycle Index, the PTT Slot Cycle Index, the Max Slot Cycle Index and the Slot Cycle Index is selected as the paging slot cycle index; and step S119, the smallest value of the Max PTT Slot Cycle Index, the Max Slot Cycle Index and the Slot Cycle Index is selected as the paging slot cycle index.

The above-mentioned PTT version number of the mobile station corresponds to the function of the mobile station. The protocol version number of the mobile station and the related descriptions of the mobile station are shown in Table 1.

If the PTT version number of the mobile station is 1, then it corresponds to an enhanced PTT group call; if the PTT version number of the mobile station is 2, then it corresponds to the support for fast call access into the mobile station; if the PTT version number of the mobile station is 3, then it corresponds to the support large group paging of the mobile station; if the PTT version number of the mobile station is 5, then it corresponds to the support for negative slot paging of the mobile station and the first stage of a conventional PTT group call; and if the PTT version number of the mobile station is 6, then it corresponds to the support for supplementary channel transfer signaling and the second stage of the conventional PTT group call.

TABLE 1

| Protocol version number of the mobile station | Function descriptions of the mobile station |
| --- | --- |
| 1 | enhanced PTT group call |
| 2 | support fast call access into the mobile station |
| 3 | support large group paging of the mobile station |
| 4 | Reserved |
| 5 | support negative slot paging of the mobile station and the first stage of a conventional PTT group call |
| 6 | support supplementary channel transfer signaling and the second stage of the conventional PTT group call |

Figure 2:
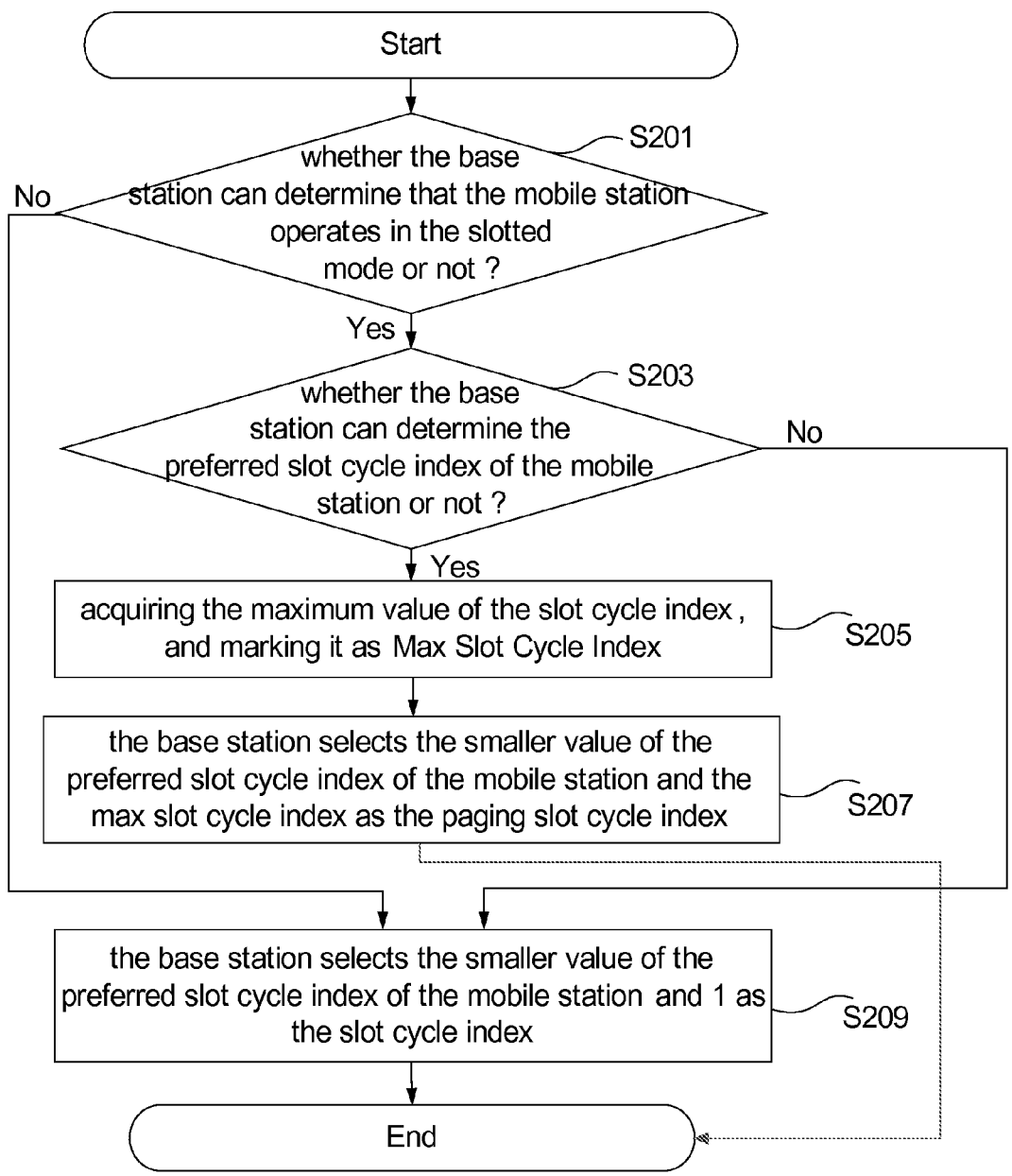
FIG. 2 is a flowchart of a method for determining a paging time slot during a base station executing non-trunking service in a CDMA trunking system according to embodiments of the present invention.

FIG. 2 is a flowchart of a method for determining a paging time slot during a base station executing non-trunking service in a CDMA trunking system according to embodiments of the present invention. As shown in FIG. 2, the method for determining a paging time slot during a base station executing non-trunking service in a CDMA trunking system according to the embodiments of the present invention comprises: when the base station can determine that the mobile station operates in the slotted mode and can determine the preferred slot cycle index of the mobile station, the smaller value of the preferred slot cycle index of the mobile station and the max slot cycle index is selected as the first slot cycle index, and the base station pages the mobile station with the slot cycle determined by the first slot cycle index; and when the base station can not determine whether the mobile station operates in the slotted mode or not, or can not determine the slot cycle index of the mobile station, the smaller value of the preferred slot cycle index of the mobile station and 1 is selected as the second slot cycle index, and the base station pages the mobile station with the slot cycle determined by the second slot cycle index.

Specifically as shown in FIG. 2, the method for determining a paging time slot during a base station executing non-trunking service in a CDMA trunking system according to the embodiments of the present invention mainly comprises the following processing (step S201-step 209):

step S201, whether the base station can determine that the mobile station operates in the slotted mode or not; if yes, then execute step S203; otherwise, execute step S209;

step S203, whether the base station can determine the preferred slot cycle index of the mobile station or not; if yes, then execute step S205; otherwise, execute step S209;

step S205, the maximum value of the slot cycle index is acquired and marked as Max Slot Cycle Index;

step S207, the base station selects the smaller value of the preferred slot cycle index of the mobile station and the max slot cycle index as the paging slot cycle index; and step S209, the base station selects the smaller value of the preferred slot cycle index of the mobile station and 1 as the slot cycle index.

That the base station can determine that the mobile station operates in the slotted mode comprises but is not limited to the following scenarios: after the mobile station has registered, the base station can know whether the mobile station is in the slotted mode or not; that the base station can not determine whether the mobile station operates in the slotted mode or not refers to but is not limited to the following scenarios: before the mobile station registers, the base station knows neither whether the mobile station is in the slotted mode or not nor the specific value of the slot cycle index of the mobile station.

According to the embodiments of the present invention, a device for determining a paging time slot during a base station executing non-trunking service in a CDMA trunking system is also provided.

Figure 3:
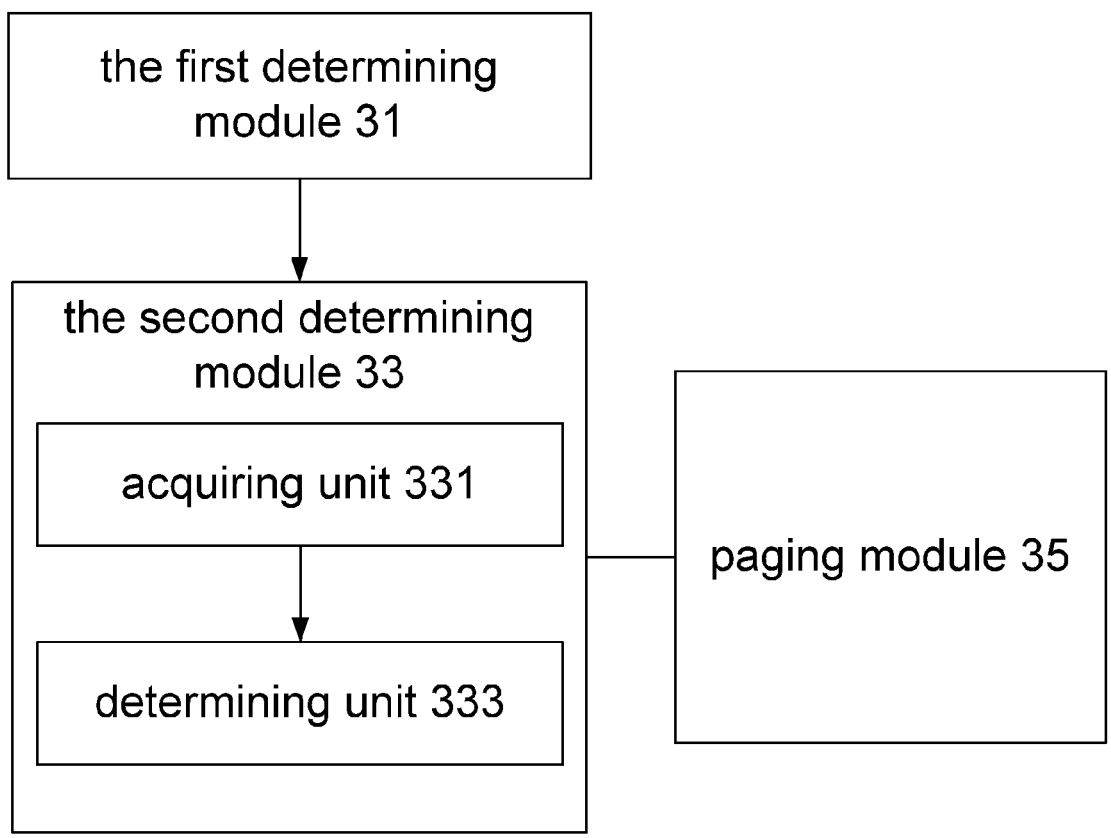
FIG. 3 is a structure block diagram of a device for determining a paging time slot during a base station executing non-trunking service in a CDMA trunking system according to embodiments of the present invention.

FIG. 3 is a structure block diagram of a device for determining a paging time slot during a base station executing non-trunking service in a CDMA trunking system according to embodiments of the present invention; as shown in FIG. 3, the device for determining a paging time slot during a base station executing non-trunking service in a CDMA trunking system according to the embodiments of the present invention comprises: a first determining module 31, a second determining module 33 and a paging module 35. Wherein the first determining module 31 is used to determine an operate mode of a mobile station, wherein the operate mode comprises: a slotted mode and a non-slotted mode; the second determining module 33 is connected to the first determining module 31 and is used to determine a paging slot cycle index of the mobile station; the paging module 35 is connected to the second determining module 33 and is used to page the mobile station with a slot cycle determined by the paging slot cycle index determined by the second determining module 33.

Furthermore, as shown in FIG. 3, the second determining module 33 may comprise: an acquiring unit 331 and a determining unit 333. Wherein the acquiring unit 331 is used to acquire a preferred slot cycle index of the mobile station; the determining unit 333 is used to determine the paging slot cycle index according to the value acquired by the first determining module 31 and the value acquired by the acquiring unit 331.

Specifically, when the operate mode of the mobile station acquired by the first determining module 31 is the slotted mode and the acquiring unit 331 has acquired the preferred slot cycle index of the mobile station, the determining unit 333 selects the smaller value of the preferred slot cycle index and the max slot cycle index as the paging slot cycle index; when the value acquired by the first determining module 31 is an invalid value, or the acquired operate mode of the mobile station is the non-slotted mode, or the value acquired by the acquiring unit 331 is an invalid value, the determining unit 333 uses 1 as the preferred slot cycle index of the mobile station, and selects the smaller value of the preferred slot cycle index and 1 as the paging slot cycle index.

In summary of the above, the technical scheme in the present invention can be used to improve the access speed after boot-up and thereby reduce the restrictions on the PTT calls and other functions by determining the slot cycle of paging the mobile station on the condition that the base station can or can not determine whether the mobile station operates in the slotted mode or not, respectively.

The above descriptions are just the preferred embodiments of the present invention, but are not used to limit the present invention; as to those skilled in the art, the present invention can have various changes and variations. Any and all modifications, equivalent substitutes, and improvements, etc, made within the spirit and principle of the present invention shall all be included into the scope of protection of the present invention.

What is claimed is:

1. A method for determining a paging time slot during a base station executing non-trunking service in a CDMA trunking system, comprising:

when a base station can determine that a mobile station operates in a slotted mode and can determine a preferred slot cycle index of the mobile station, the smaller value of the preferred slot cycle index of the mobile station and a max slot cycle index being selected as a first slot cycle index, and the base station paging the mobile station with a slot cycle determined by the first slot cycle index; and when the base station can not determine whether the mobile station operates in the slotted mode or not, or can not determine the slot cycle index of the mobile station, the smaller value of the preferred slot cycle index of the mobile station and 1 being selected as a second slot cycle index, and the base station paging the mobile station with the slot cycle determined by the second slot cycle index.

2. The method according to claim 1, wherein the preferred slot cycle index is determined by the following method:

if the base station judges that a Push-To-Talk (PTT) version number of the mobile station is greater than or equal to a predefined value and if the base station has acquired negative slot information of the mobile station, then the smallest value of a max PTT slot cycle index, a PTT slot cycle index, a max slot cycle index and a slot cycle index is selected as the preferred slot cycle index;

if the base station judges that the PTT version number is greater than or equal to the predefined value, and if the base station has not acquired the negative slot information of the mobile station, then the base station selects the smallest value of the max PTT slot cycle index, the max slot cycle index and the slot cycle index as the preferred slot cycle index;

if the base station judges that the PTT version number is smaller than the predefined value, then the base station selects the smaller value of the max slot cycle index and the slot cycle index as the preferred slot cycle index;

wherein when the base station can not determine whether the mobile station operates in the slotted mode or not, or can not determine the slot cycle index of the mobile station, the value of the slot cycle index is 1.

3. The method according to claim 2, wherein the PTT version number of the mobile station corresponds to the function of the mobile station.

4. The method according to claim 3, wherein:

if the PTT version number of the mobile station is 1, then it corresponds to an enhanced PTT group call;

if the PTT version number of the mobile station is 2, then it corresponds to the support for fast call access into the mobile station;

if the PTT version number of the mobile station is 3, then it corresponds to the support for large group paging of the mobile station;

if the PTT version number of the mobile station is 5, then it corresponds to the support for negative slot paging of the mobile station and the first stage of a conventional PTT group call; and if the PTT version number of the mobile station is 6, then it corresponds to the support for supplementary channel transfer signaling and the second stage of the conventional PTT group call.

5. The method according to claim 4, wherein the mobile station comprises: a mobile terminal, a fixed station and a vehicular station.

6. The method according to claim 3, wherein the mobile station comprises: a mobile terminal, a fixed station and a vehicular station.

7. The method according to claim 2, wherein the predefined value can be any one of 1 to 9.

8. The method according to claim 7, wherein the mobile station comprises: a mobile terminal, a fixed station and a vehicular station.

9. The method according to claim 2, wherein the mobile station comprises: a mobile terminal, a fixed station and a vehicular station.

10. The method according to claim 1, wherein:
that the base station can determine that the mobile station operates in the slotted mode comprises:
after the mobile station has registered, the base station can determine whether the mobile station is in the slotted mode or not; and
that the base station can not determine whether the mobile station operates in the slotted mode or not comprises:
before the mobile station registers, the base station can not determine whether the mobile station is in the slotted mode or not, and can not determine the slot cycle index of the mobile station.

11. The method according to claim 10, wherein the mobile station comprises: a mobile terminal, a fixed station and a vehicular station.

12. The method according to claim 1, wherein the mobile station comprises: a mobile terminal, a fixed station and a vehicular station.

13. A device for determining a paging time slot during a base station executing non-trunking service in a CDMA trunking system, comprising:
a first determining module, which is used to determine an operate mode of a mobile station, wherein the operate mode comprises: a slotted mode and a non-slotted mode;
a second determining module, which is used to determine a paging slot cycle index of the mobile station; and
a paging module, which is used to page the mobile station with a slot cycle determined by the paging slot cycle index determined by the second determining module;
wherein the second determining module comprises:
an acquiring unit, which is used to acquire a preferred slot cycle index of the mobile station; and
a determining unit, which is used to determine the paging slot cycle index according to the value acquired by the first acquiring module and the value acquired by the acquiring unit;
when the operate mode of the mobile station acquired by the first determining module is the slotted mode and the acquiring unit has acquired the preferred slot cycle index of the mobile station, the determining unit selects the smaller value of the preferred slot cycle index and a max slot cycle index as the paging slot cycle index; and
when the value acquired by the first determining module is an invalid value, or the acquired operate mode of the mobile station is the non-slotted mode, or the value acquired by the acquiring unit is an invalid value, 1 is used as the preferred slot cycle index of the mobile station, and the smaller value of the preferred slot cycle index and 1 is selected as the paging slot cycle index.

* * * * *